July 9, 1946.  E. E. JELLEY ET AL  2,403,722
CAMOUFLAGE DETECTION
Filed Oct. 24, 1942

EDWIN E. JELLEY
LOT S. WILDER
INVENTORS

BY
R. Frank Smith
ATTORNEYS

Patented July 9, 1946

2,403,722

UNITED STATES PATENT OFFICE 2,403,722

CAMOUFLAGE DETECTION

Edwin E. Jelley and Lot S. Wilder, Rochester, N. Y., assignors to Eastman Kodak Company, Rochester, N. Y., a corporation of New Jersey Application October 24, 1942, Serial No. 463,214

8 Claims. (Cl. 95—2)

This invention relates to aerial color photography and particularly to a method of camouflage detection by means of color photography.

One of the most common methods of camouflaging objects on land during warfare consists in causing them to appear as trees or foliage. Objects thus camouflaged cannot be readily detected from the air by visual observation or black and white photography because the pigments used to simulate foliage appear and photograph on normal or panchromatic film much as the foliage itself would.

It is well known that most natural foliage has a high degree of infra-red reflecting power and that most green paints used to simulate foliage are poor in infra-red reflectance. Advantage has been taken of this fact in camouflage detection by photographing objects suspected of camouflage both on infra-red film and upon normal color-sensitive or panchromatic film and comparing the photographs thus subjected. An object which appears to have different contrast on the picture obtained on the infra-red emulsion than it does on the picture obtained on the normal emulsion is known to have been camouflaged. This method of camouflage detection necessitates the use of two cameras or at least two exposures of the same object at about the same time and the difference in contrast is frequently not easy to detect in a black and white image.

It is, therefore, an object of the present invention to provide a novel method for the detection of camouflage by aerial photography. A further object is to provide a method for the detection of camouflage by color photography. A still further object is to provide a material which will enable the detection of camouflage by means of color contrasts. Other objects will appear from the following description of our invention.

These objects are accomplished by providing a multilayer photographic material having emulsion layers sensitive to different spectral regions, one or more layers of which is sensitive to infra-red light, alone or in addition to a portion of the visible spectrum, and the others sensitive to regions of the visible spectrum.

Figure 1:
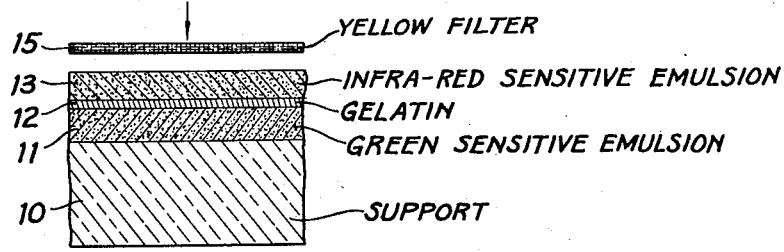
Figure 2:
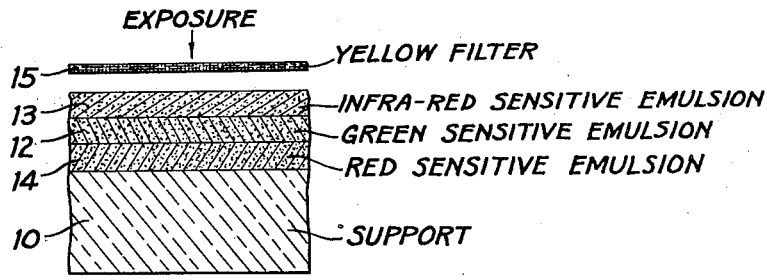
Figure 3:
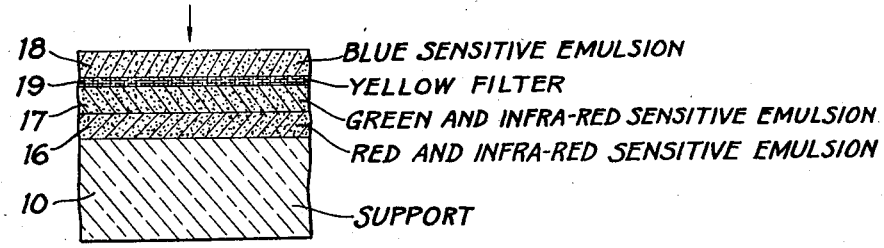

In the accompanying drawing, Fig. 1 is a sectional view of a two-layer material suitable for use according to our invention, Fig. 2 is a sectional view of a three-layer material, and Fig. 3 is a sectional view of another type of three-layer material suitable for use according to our invention.

In our system of color differentiation for aerial photography from high altitudes, we propose to make use of multi-layer coatings in which one or more of the individual layers is sensitized to a band in the infra-red region of the spectrum, and may be sensitive, in addition, to a region of the visible spectrum. One or more of the layers is sensitive only to a region of the visible spectrum, the layers being preferably coated in superposed relation upon a single support. In certain modifications of our invention, the inherent blue-sensitivity of the infra-red emulsion layer or layers is overcome by the use of a blue-absorbing filter, such as a yellow filter, over the lens of the aero camera. A Wratten No. 12 or No. 15 filter is suitable for this purpose. A layer of the film is preferably green or red-sensitive, or both green and red-sensitive layers may be used. Upon photographing an area of natural foliage containing an object painted with a pigment intended to simulate natural foliage, with this material, the natural foliage and the painted object would record differently upon the sensitive material. Both might record equally upon a green-sensitive emulsion layer but upon an infra-red sensitive layer the natural foliage would record to a high degree while the painted object would record very little or not at all, depending upon the degree of infra-red reflectance of the pigment employed. Upon development of this material in colors, there would be a distinct difference in color between the natural foliage and the camouflaged object.

Although any suitable method for the formation of colored images in the layers may be employed, such as dye coupling development, bleach-out, dye toning, etc., we intend to use a dye coupling development method and prefer to use a material in which the color forming or coupling components are incorporated in the emulsion layers prior to exposure. In such material the speed of the layers may be kept high and the material may be processed readily after exposure so that a picture is obtained in the shortest possible time. The material may be processed by reversal or may be processed to a negative and a positive in colors printed from it. Since the colors obtained with a camera material such as we prefer to use are false in any case, that is, are not complementary to the color of the exposure light by which they are made, the order of the couplers in the layers is unimportant. The chief purpose is to obtain color contrast and any arrangement of couplers which will secure this result may be used.

In the accompanying drawing we have shown in Fig. 1 a sectional view of a two-layer film made according to our invention. As shown therein the support 10 of any suitable material such as cellulose nitrate, cellulose acetate or other cellulose ester, glass, synthetic resin, paper, or pigmented cellulose ester or ether is coated with a gelatino-silver halide emulsion layer 11, sensitive to green light, a plain gelatin interlayer 12 and a gelatino-silver halide emulsion layer 13 sensitive to infra-red light. With this material exposure is made through a yellow filter 15 absorbing blue light so that only the green and infra-red rays are recorded.

In place of the two layers shown in Fig. 1, two different infra-red sensitive layers could be used in place of one infra-red and one green-sensitive layer, or the green-sensitive layer could be replaced by a yellow- or red-sensitive layer to meet specific requirements.

In the material shown in Fig. 1, the infra-red sensitive layer preferably contains a coupler producing a magenta image although one producing a red image may also be used. The green-sensitive layer preferably contains a coupler producing a green image although one producing a cyan image might also be used. The material is developed by reversal processing consisting of the following steps where the material contains couplers in the layers.

1. First development.
2. Wash.
3. Expose to white light and develop in a color forming developer.
4. Acid rinse.
5. Removal of silver.
6. Wash and dry.

In using the material of Fig. 1, an image is obtained in which greens which reflect infra-red, such as the chlorophyl of natural foliage, range from green or cyan, and greens which absorb infra-red, such as artificial pigments, appear magenta or red to neutral. Reds appear green or cyan depending upon the couplers used and neutrals appear neutral or reddish-neutral.

In Fig. 2 we have shown a three-layer material made according to our invention in which the support 10 is coated in succession with a red-sensitive emulsion layer 14, a green-sensitive emulsion layer 12 and an infra-red sensitive emulsion layer 13. Gelatin interlayers (not shown) may be present between the emulsion layers. In this material the infra-red sensitive layer preferably contains a coupler producing a cyan image, the green-sensitive layer preferably contains a coupler producing a yellow image and the red sensitive layer preferably contains a coupler producing a magenta image. Exposure is made through a yellow filter 15.

The couplers contained in our material illustrated in Fig. 2 may be of any suitable composition disclosed in the art but we prefer to prepare emulsions such as those described in Mannes & Godowsky U. S. application Serial No. 314,689, filed January 19, 1940, now Patent No. 2,304,940, of December 15, 1942, or Jelley and Vittum U. S. application Serial No. 371,612, filed December 26, 1940, now Patent No. 2,322,027 of June 15, 1943. For example, in the case of emulsions prepared as described in the Jelley and Vittum application, the coupler used to produce the cyan image might be 2-lauryl-4-chlorophenol, the coupler used to produce the yellow image might be N-amyl-p-benzoylacetaminobenzene sulfonate and the coupler used to produce the magenta image might be 2-cyanoacetyl-5-benzoylaminocoumarone.

After exposure, the material shown in Fig. 2 is preferably processed by reversal in the manner described above or more specifically, by the use of the following treatment.

The material, after exposure, is developed in a black and white developer of the following composition:

| | |
|---|---|
| Monomethyl-p-aminophenol sulfate grams__ | 3 |
| Sodium sulfite (desiccated) _____do____ | 45 |
| Hydroquinone _____do____ | 12 |
| Sodium carbonate (desiccated) _____do____ | 67.5 |
| Potassium bromide_____do____ | 2 |
| Water to_____liters__ | 1 |

The film is then washed or hardened for 5 minutes in water and is exposed to white light for a time sufficient to expose fully all remaining silver halide, and is then developed in a color-forming developer of the following composition:

| | |
|---|---|
| 2-amino-5-diethylaminotoluene HCl_grams__ | 2 |
| Sodium sulfite_____do____ | 2 |
| Sodium carbonate_____do____ | 20 |
| Potassium bromide_____do____ | 2 |
| Water to_____liter__ | 1 |

The film is then rinsed in a 2% solution of acetic acid, and the silver is removed with ferricyanide and hypo. The material is then washed and dried.

In the picture obtained on this material, greens which reflect infra-red, such as natural foliage, appear a reddish-magenta and greens which absorb infra-red such as more artificial pigments appear blue. Reds appear yellow and neutrals appear neutral.

A further type of three-layer material, in which the colors obtained are roughly the same as in nature, is shown in Fig. 3 of the drawing. As shown therein, a multi-layer material is employed consisting of support 10 and emulsion layers 16, 17, and 18 sensitive respectively to the red, green, and blue regions of the visible spectrum. These layers contain couplers capable of producing a cyan image in red-sensitive layer 16, a magenta image in green-sensitive layer 17, and a yellow image in blue-sensitive layer 18. This is the normal order to produce a natural-color image. However, layers 16 and 17 are also sensitive to infra-red rays. A yellow filter 19 between layers 17 and 18 prevents the action of blue light on layers 16 and 17. Layers 16 and 17 therefore record infra-red rays, as well as red and green light. Upon reversal processing, natural foliage, having a high degree of infra-red reflectance, would show as yellowish-green, and artificial green pigments, having a low degree of infra-red reflectance, would show as dark green. While the contrast difference in this case is not so great as is the arrangements previously described, it has the advantage that colors other than greens would be roughly the same as in nature.

In alternative arrangements similar to those shown in Fig. 3, the blue-sensitive, green-sensitive, or red-sensitive layers alone might contain an infra-red sensitizer.

Another method for obtaining a reversal image for showing selective infra-red and red-absorption would be accomplished by the use of a film having an infra-red sensitive layer, a yellow filter layer below it and a red-sensitive layer nearest the support but without couplers in the emulsion layers. Such two-layer material would lend itself to a simplified selective reversal method of processing. For example, the material might be processed as follows:

1. Develop.
2. Wash.
3. Expose to red light from which the infra-red has been removed by a suitable filter.
4. Color develop to yield a dye in the red-sensitive layer.
5. Wash.
6. Expose to infra-red or white light.
7. Color develop to yield a dye of a different color in the infra-red sensitive layer.
8. Wash.
9. Remove silver images.
10. Wash and dry.

Another method for processing this material would involve the following steps:

1. Develop.
2. Wash.
3. Expose to blue light from the frong.
4. Color develop to yield a dye in the outer layer.
5. Wash.
6. Expose to blue light from the back.
7. Color develop to yield a dye of a different color in the bottom layer.
8. Wash.
9. Remove silver images.
10. Wash and dry.

In a two-layer or three layer material having an infra-red sensitive layer, such layer might be left free of incorporated coupler, and a colored image produced in it by means of a coupler in the developing solution. By such arrangement, a higher infra-red sensitivity can be obtained.

In photographing an object suspected of camouflage with our material, it may, in certain cases, be necessary or helpful to photograph the object simultaneously on black and white material. Since the colors obtained with our material may be false, they then give no indication of the natural color of the object, but indicate color contrast in a striking manner. If a particular object is suspected of camouflage, this color contrast will be readily apparent on our material. However, if it is not known definitely where the object is located, a black and white picture for comparison would be helpful. In such case the object would be invisible on the black and white photograph, that is, would display no contrast difference when compared with the surroundings. When compared with the photograph on our material, a color contrast would indicate that the object has been camouflaged. If the object displayed contrast on both the black and white photograph and on the photograph on our material, it would not be a camouflaged object.

One advantage of the material shown in Fig. 3 is that it can be used in the normal way for camouflage detection, or it can be used in combination with an infra-red filter in the camera, to produce natural-color picture, infra-red rays being thus excluded from the exposing light.

Numerous modifications are possible in the film used according to our invention and it will be understood that our invention is to be taken as limited only by the scope of the appended claims.

We claim:

1. The method of detecting camouflage materials by photography, which comprises photographing a suspected object on a multi-layer photographic material having at least one uncolored layer sensitive to the infra-red region of the spectrum and at least one other uncolored layer sensitive to a visible region of the spectrum, developing said material and forming differently colored images therein.

2. The method of detecting camouflage materials by photography which comprises photographing a suspected object on a multi-layer photographic material having one uncolored layer sensitive to the infra-red region of the spectrum and containing a color former capable of producing a colored image and at least one other uncolored layer sensitive to a visible region of the spectrum and containing a color former capable of producing a colored image and at least one other uncolored layer sensitive to a visible region of the spectrum and containing a color former capable of producing an image of another color, developing said material and forming differently colored images therein.

3. The method of detecting camouflage materials by photography which comprises photographing a suspected object on a multilayer photographic material having one uncolored layer sensitive to the infra-red region of the spectrum and containing a color former capable of producing a colored image, a second uncolored layer sensitive to the green region of the spectrum and containing a second color former capable of producing an image of a second color and a red-sensitive uncolored layer containing a color former capable of producing an image of a third color, developing said material and forming differently colored images therein.

4. The method of detecting camouflage materials by photography which comprises photographing a suspected object on a multi-layer photographic material having at least one uncolored layer sensitive to the infra-red region of the spectrum and at least one other uncolored layer sensitive to a visible region of the spectrum, at least one of said layers containing a color-forming material capable of producing a colored image on development in the form of dispersed particles mixed with a water-insoluble, water-permeable colloidal material, developing said material and forming differently colored images therein.

5. The method of detecting camouflage materials by photography which comprises photographing a suspected object on a multi-layer photographic material having at least one uncolored layer sensitive to the infra-red region of the spectrum and at least one other uncolored layer sensitive to a visible region of the spectrum, said layers containing different color formers capable of producing differently colored images in the layers on photographic development, said color formers being present in the emulsion layers in the form of dispersed particles mixed with a water-insoluble, water-permeable colloidal material, developing said material and forming differently colored images therein.

6. The method of detecting camouflage materials by photography which comprises photographing a suspected object on a multi-layer photographic material having an infra-red sensitive uncolored layer containing particles of color former capable of producing a cyan image, a green-sensitive uncolored layer containing particles of a color former capable of producing a yellow image, and a red-sensitive layer containing particles of a color former capable of producing a magenta image, one of said color formers being present in the layers in dispersed form in mixture with a water-insoluble, water-permeable colloidal material, developing said material and forming differently colored images in the layers thereof by reversal.

7. The method of detecting camouflage materials by photography, which comprises photographing a suspected object on a multi-layer photographic material having at least one uncolored layer sensitive to the infra-red region of the spectrum and also to a visible region of the spectrum, and at least one other uncolored layer sensitive only to a visible region of the spectrum, developing said material and forming differently colored images therein.

8. The method of detecting camouflage materials by photography, which comprises photographing a suspected object on a multi-layer photographic material having at least one uncolored layer sensitive to the infra-red region of the spectrum and also to a visible region of the spectrum and containing a color former capable of producing in said layer a colored image complementary in color to the visible region to which the layer is sensitive, and at least one other uncolored layer sensitive only to a visible region of the spectrum and containing a color former capable of producing in said layer a colored image complementary in color to the sensitivity of said layer, developing said material and forming differently colored images therein.

EDWIN E. JELLEY.
LOT S. WILDER.